United States Patent
Ohkubo

(10) Patent No.: US 8,031,582 B2
(45) Date of Patent: Oct. 4, 2011

(54) OPTICAL INFORMATION RECORDING MEDIUM, BCA INFORMATION RECORDER, AND BCA INFORMATION RECORDING METHOD

(75) Inventor: Shuichi Ohkubo, Tokyo (JP)

(73) Assignee: NEC Corporation, Tokyo (JP)

( * ) Notice: Subject to any disclaimer, the term of this patent is extended or adjusted under 35 U.S.C. 154(b) by 322 days.

(21) Appl. No.: 12/066,809

(22) PCT Filed: Sep. 19, 2006

(86) PCT No.: PCT/JP2006/318489
§ 371 (c)(1),
(2), (4) Date: Mar. 13, 2008

(87) PCT Pub. No.: WO2007/040038
PCT Pub. Date: Apr. 12, 2007

(65) Prior Publication Data
US 2009/0046558 A1 Feb. 19, 2009

(30) Foreign Application Priority Data
Sep. 30, 2005 (JP) .................... 2005-286720

(51) Int. Cl.
*G11B 7/24* (2006.01)
(52) U.S. Cl. .................... 369/275.3; 369/275.4; 369/283
(58) Field of Classification Search .... 369/275.1–275.5, 369/100, 283, 282, 277
See application file for complete search history.

(56) References Cited

U.S. PATENT DOCUMENTS

| | | | |
|---|---|---|---|
| 7,345,984 B2 * | 3/2008 | Watabe et al. | 369/275.2 |
| 7,376,070 B2 * | 5/2008 | Sakaue et al. | 369/275.3 |
| 7,616,552 B2 * | 11/2009 | Abe et al. | 369/275.4 |
| 2004/0032813 A1 | 2/2004 | Lee et al. | |
| 2005/0078594 A1 | 4/2005 | Takahashi et al. | |
| 2005/0122887 A1 | 6/2005 | Abe | |
| 2007/0025234 A1 * | 2/2007 | Takazawa et al. | 369/275.5 |
| 2007/0263525 A1 * | 11/2007 | Ohkubo | 369/275.2 |

FOREIGN PATENT DOCUMENTS

| | | |
|---|---|---|
| EP | 0 807 929 A1 | 11/1997 |
| EP | 1 522 996 A2 | 4/2005 |
| EP | 1 542 211 A2 | 6/2005 |
| JP | 2005-135569 A | 5/2005 |
| JP | 2005-196940 A | 7/2005 |
| WO | WO 02/37483 A1 | 5/2002 |

* cited by examiner

*Primary Examiner* — Ali Neyzari
(74) *Attorney, Agent, or Firm* — Sughrue Mion, PLLC

(57) ABSTRACT

Multilayered optical information recording media involve a problem that a BCA is erroneously formed in a different information recording layer even if the BCA is intended to be formed in a specific information recording layer.

An optical information medium (1) for recording/reproducing information by applying a laser beam includes two or more recording layers (11, 12) for recording/reproducing information by receiving a laser beam at the same laser beam incident surface (1a). A geometrical irregularity (K) is formed in an area (inner peripheral side) (21) for a BCA on one recording layer (12), and a mirror surface is formed in the area of the other information recording layer (11) corresponding to the BCA area (21). The geometrical irregularity (K) is detected when focus servo is actuated so as to detect the desired information recording layer. Thus, a BCA is prevented from being erroneously formed in another information recording layer.

14 Claims, 7 Drawing Sheets

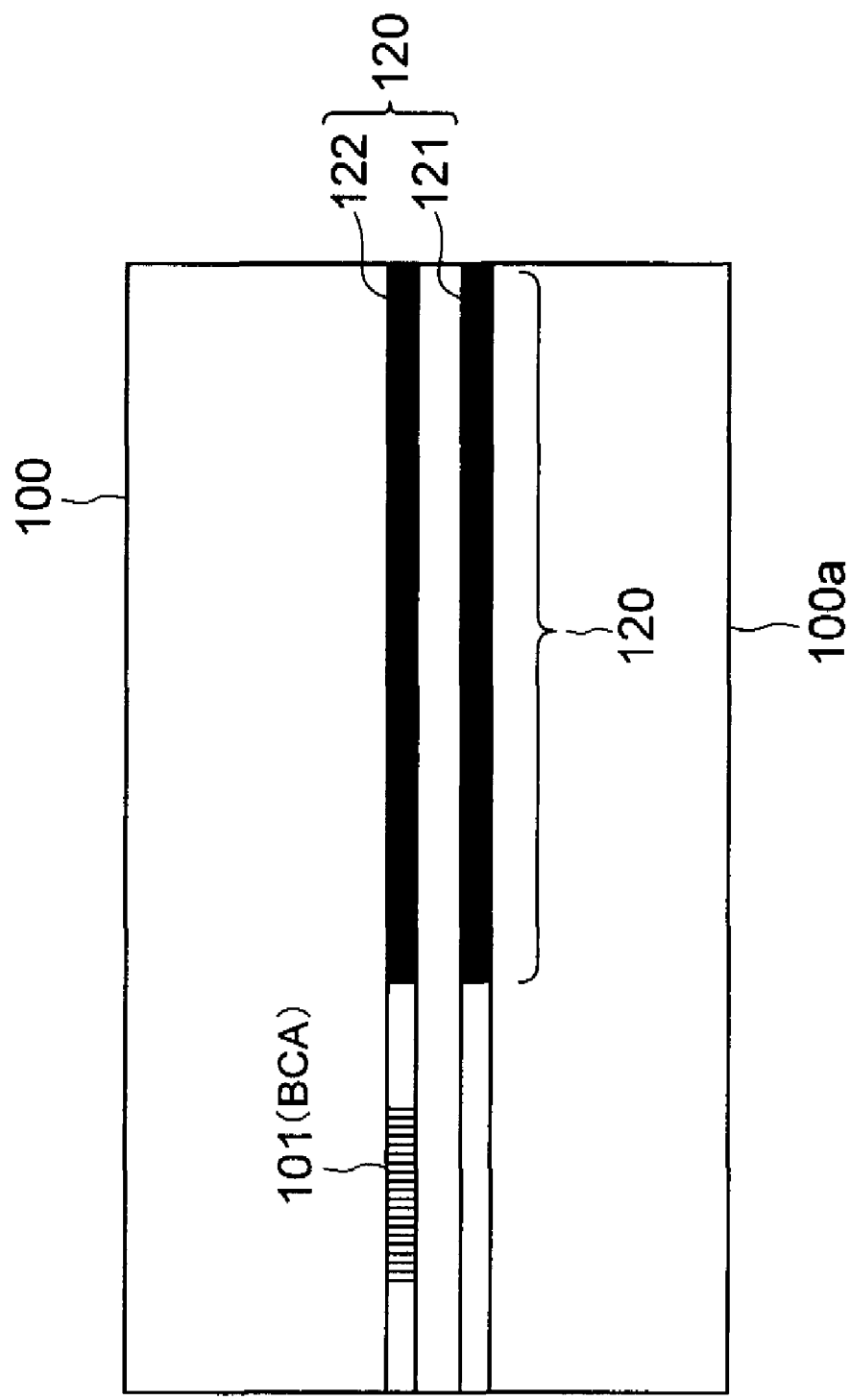

OPTICAL INFORMATION RECORDING MEDIUM, BCA INFORMATION RECORDER, AND BCA INFORMATION RECORDING METHOD

CROSS-REFERENCE TO RELATED APPLICATIONS

This application is based upon and claims the benefit of priority from Japanese patent application No. 2005-286720, filed on Sep. 30, 2005, the disclosure of which is incorporated herein in its entirety by reference.

TECHNICAL FIELD

The present invention relates to an optical information recording medium which, among optical information recording media performing recording or reproduction of information by irradiation of laser beams, includes a plurality of recording layers having a same laser beam incident surface. More specifically, the present invention relates to an optical information recording medium having a recording layer that includes a burst cut area (BCA) including individual identifying information, a BCA information recorder and a BCA information recording method for the optical information recording medium.

BACKGROUND ART

Optical discs have been widely spread as the optical information recording media with which recording or reproduction of information is performed by irradiation of laser beams. These types of optical discs include CD-ROMs and DVD-ROMs having embossed pit strings formed in advance to be used exclusively for reproduction, CD-Rs and DVD-Rs to which data can be recorded only once, CD-RWs, DVD-RWs, and DVD-RAMs which are capable of rewriting, etc. Each of these optical discs is structured to perform recording or reproduction of information by irradiating a converging beam spot to an information recording layer via a transparent substrate. Pit strings or grooves are formed on the information recording layer along a spiral recording track.

Among those optical discs, there is such a type that has an area called a burst cut area (BCA) as information that can be reproduced by a converging beam spot of an optical disc device, in addition to having the spiral recording track. This BCA is formed with segments extending in a radial direction by being arranged at prescribed intervals on a circumference in a low-reflectance form, and the pattern thereof is determined according to the contents of information to be recorded. In a sense, it is in a structure where a barcode used in general is provided circumferentially. Burst cut information such as the type (ROM, write-once type, or rewritable type) of the optical information recording medium and the copyright managed number is recorded in the BCA.

FIG. 4 shows an illustration of a BCA 101 and a fragmentary enlarged view thereof for explanations. As shown in FIG. 4, the BCA 101 is provided in a radius position range on a rotation center side (inside diameter side) of a specific recording layer of an optical information recording medium (optical disc) that includes a multilayered recording layer. The BCA 101 is formed with a plurality of low-reflectance segments 101 lined on a circumference in such a manner that the segments in a uniform length are lined in a radial direction as if short strips are lined at a small pitch to form a prescribed pattern.

The area where the BCA 101 is provided has no track for a converging beam spot "e" to follow. Thus, the optical disc device scans the converging beam spot "e" on the BCA 101 in the circumferential direction as indicated by an arrow S in accordance with rotation, while applying only the focus servo. At this time, the reflected light amount of the converging beam spot "e" is fluctuated depending on the patterns and it is outputted as a signal. Therefore, information associated with the BCA 101 recorded on the above-described optical disc can be reproduced based on the signal.

An example of such BCA 101 is depicted in a standardization material (ECMA-267; 120 mm DVD-Read-Only Disc) of ECMA (European Computer Manufacture Association).

Comparing the recording of information by using the BCA with the recording of information by using the pits, the information recording with the BCA is advantageous in respect that the BCA can be formed individually for each optical disc after manufacturing the optical discs. For example, the copyright management number can be added to the optical disc.

In this case, as a way to form the BCA in an optical disc such as a ROM used exclusively for reproduction, a metal reflection film formed on an information recording layer may be removed by irradiation of a strong laser thereby to form a low-reflectance part.

However, the interval of the pattern that can be formed with this method (the method for forming the BCA after manufacturing the optical disc) becomes considerably larger than the interval of the pits. For example, the practical value of the width of the low-reflectance part 101a is about 10 μm, and the widest used pattern interval is 100 μm or more.

Patent Document 1: International Patent Publication W2002/037483

DISCLOSURE OF THE INVENTION

Recently, optical discs having two information recording layers which can perform recording and reproducing from a single incident surface are widely put into practical use. FIG. 5 shows an example of a sectional view of a conventional optical information recording medium that has two recording layers. A multilayered optical information recording medium 100 shown in FIG. 5 is provided with two information recording layers 120 (that is, a 0-th information recording layer 121 and a first information recording layer 122) which can be reproduced by a converging light beam from the incident surface 100a. Each of the information recording layers 121 and 122 includes a recordable optical information recording film, and is made of a multilayered thin film including an organic dye film, a phase change recording film, or the like.

The intervals of each of the information recording layers 121 and 122 are desirable to be in a range with which an aberration of the converging light beam transmitting through a transparent substrate that is a material of the optical disc 100 does not change largely. Thus, the interval is set as approximately 50 μm in a DVD-ROM, for example. At this time, the diameter of the converging light beam on the 0-th information recording layer 121 when a converging beam spot is formed on the first information recording layer 122, for example, is about 40 μm. This is the size of the same order as that of the pattern of the BCA 101 mentioned earlier.

Therefore, when the BCA is formed in both information recording layers 121 and 122, fluctuation of the converging light beam caused by the pattern of the BCA on one of the information recording layers when forming a converging beam spot on the other information recording layer reaches a level that cannot be ignored. In order to avoid this, it is necessary to form the BCA only on either one of the layers.

In this case, by determining in advance which one of the layers, the 0-th information recording layer or the first information recording layer, to form the BCA, it is possible to obtain such an advantage that the time for a recorder or a reproducing device to identify the medium can be shortened.

In the meantime, when the recording layer on which the BCA is formed is unknown, it is necessary to reproduce both the 0-th recording layer and the first recording layer. However, when it is known in advance, information associated with the BCA can be reproduced in a short time by reproducing only the recording layer on which the BCA is formed.

When forming the BCA on a double-layered ROM, as shown in FIG. 6, a laser beam $L_1$ for forming a BCA is irradiated from an incident surface that is on the opposite side of the beam incident surface from which information is reproduced so as to remove a metal reflection film provided on the first information recording layer 122. Normally, the metal reflection film formed on the first information recording layer 122 has a film thickness with which the transmittance thereof becomes 10% or less. This is because it is necessary to increase the reflectance of the first information recording layer 122 sufficiently high for securing a signal amplitude, since reproduction of the first information recording layer 122 is performed via the 0-th information recording layer 121.

Provided that the transmittance of the 0-th information recording layer 121 is $T_0$ and the reflectance of the first information recording layer alone is $R_1$, the reflectance R of the first information recording layer 122 via the 0-th information recording layer 121 becomes "$R=R_1 \times T_0^2$". Assuming that $T_0$ is 50%, it is necessary to have $R_1>60\%$ for achieving $R>15\%$. For example, a film thickness of about 50 nm is required for obtaining a reflectance of 60% with an Ag reflection film. In that case, the transmittance is about 10%.

Therefore, when a laser beam is irradiated from the first information recording layer 122 side, the laser beam hardly transmits through the first information recording layer 122 and the reflected light from the 0-th information recording layer 121 is not detected. Thus, it is possible to apply focus servo on the first information recording layer 122 securely.

In the meantime, the BCA in a recordable optical information recording medium is not formed by removing the metal reflection film, but is formed by irradiating a laser beam to an organic dye film, a phase change thin film, or the like to change the optical characteristic of the dye film, the phase change thin film, or the like, as in the case of actually recording information. For example, the information recording layer in a ROM is made of a single metal thin film, so that it is possible to form the BCA by removing the metal thin film by the laser beam. In the meantime, the information recording layer is formed by a multilayered thin film in the recordable optical information recording medium. Thus, it is difficult to remove the multilayered thin film completely by irradiation of the laser beam. Therefore, it is necessary to form the BCA in the recordable optical information recording medium by a method similar to a case of performing normal recording.

In the case of the ROM, the laser beam is irradiated from the first information recording layer 122 side when forming the BCA. Thus, the laser beam can be securely converged to the first information recording layer 122. When forming the BCA in the recordable multilayered optical information recording medium, however, it is necessary to irradiate the laser beam from the 0-th information recording layer 121 side.

The reason is as follows. When the laser beam is irradiated from the first information recording layer 122 side, the laser beam is hardly absorbed at the dye film, the phase change film, or the like, because there is the metal reflection film with low transmittance formed on the first information recording layer 122. Thus, it is not possible to increase the temperatures of those films to change the optical characteristics thereof. Therefore, it is necessary to form the BCA by irradiating the laser beam from the 0-th information recording layer 121 side with high transmittance so as to increase the temperature of the dye film, the phase change film, or the like, which forms the first information recording layer 122.

However, the laser beam is not necessarily converged to the first information recording layer 122 when the laser beam is irradiated from the 0-th information recording layer 121 side.

FIG. 7 is an illustration for describing the reason for this in a simple manner. In a case of the ROM, the transmittance of the first information recording layer 122 is extremely low. Thus, when the laser beam is irradiated from the first information recording layer 122 side, only a single focus error signal called an S-shaped curve is observed. In the meantime, when the laser beam is irradiated from the 0-th information recording layer 121 side in the recordable multilayered optical information recording medium, two S-shaped curves are to be observed as shown in FIG. 7B.

When the laser beam is tried to be converged (focused) to the first information recording layer 122 by utilizing the S-shaped curve obtained from the first information recording layer 122 out of the two S-shaped curves, it is possible that the laser beam is mistakenly converged to the 0-th information recording layer 121 since there is the S-shaped curve obtained from the 0-th information recording layer 121. When the laser beam is mistakenly converged to the 0-th information recording layer 121, the BCA is formed on the 0-th information recording layer 121. It is difficult to rewrite the once-recorded BCA. Particularly, it is not possible to rewrite the BCA on a write-once-type optical information recording medium.

Therefore, the multilayered optical information recording medium having the BCA formed mistakenly on the 0-th information recording layer 121 is considered an inferior product, so that it cannot be used.

This issue also exists in the case where the BCA is formed on the 0-th information recording layer 121. When focus servo is to be applied to the 0-th information recording layer 121, the focus servo may be mistakenly applied to the first information recording layer 122. Thus, the BCA may be formed thereon unintentionally.

As described above, while an advantage of shortening the time for identifying the medium is achieved by predetermining the layer to have the BCA formed, it is difficult to securely form the BCA on a specific information recording layer of the recordable multilayered optical information recording medium. Further, the multilayered optical information recording medium having the BCA formed mistakenly on an unexpected information recording layer becomes an inferior product.

It is therefore an object of the present invention to provide an optical information recording medium including a multi-layered recording layer with which a BCA is formed efficiently on a specific information recording layer in a stable manner as well as to provide a BCA information recorder and BCA information recording method. This makes it possible to prevent the BCA from being formed on an unexpected information recording layer (on a 0-th information recording layer 11 herein).

In order to achieve the foregoing object, an optical information recording medium according to the present invention including at least two recording layers for recording or reproducing information by irradiation of a laser beam, wherein: a burst cut area recording area as an area for recording medium identifying information and the like is provided on an inner peripheral side of one recording layer out of each of the recording layers, and an area inside a same radius of an inner peripheral side of the other recording layer at a position corresponding to the burst cut area recording area is formed as a mirror surface. Further, a geometrical irregularity that can be detected by a laser beam for identifying recording information is provided at least in a part of the burst cut area recording area described above.

Thus, BCA information regarding the recording medium and the like can be recorded efficiently to the inner peripheral side of one of the recording layers of the optical information recording medium that has multiple recording layers from a beam incident surface from which a laser beam for recording or reproducing BCA information regarding that recording medium or the like makes incident. Particularly, since the geometrical irregularity that can be detected by the recording information identifying laser beam is provided at least in a part of the burst cut area recording area, the recording layer for recording the BCA information can be securely specified by detection of the geometrical irregularity. Therefore, it is possible to dramatically decrease the inconvenience of recording the BCA information to another recording layer, thereby making it possible to obtain an advantage that generation of inferior products can be reduced greatly.

The geometrical irregularity may be an irregularity formed successively in a concentric form or spiral form by surrounding a rotation center of the optical information recording medium (claim 2). In this case, a pitch of each of the concentric form or spiral form in a radial direction may be set as 1 μm or less.

With this, the BCA recording layer can be detected by shifting the recording information identifying laser beam and the BCA information forming laser beam linearly in the radial direction at a prescribed timing with respect to the rotating action of the optical information recording medium. Therefore, it can provide an advantage that the BCA can be specified promptly.

Further, the geometrical irregularity may be formed with the same pit strings as the pit strings in the recording area of the recording layer or may be grooves formed by the pit strings arranged in a concentric form or spiral form. Further, the recording layer may be formed by laminating a phase change recording film or may be formed by laminating a recording film that exhibits an irreversible optical characteristic change by irradiation of the laser beam. A double-layered recording layer may be used as the multilayered recording layer.

Further, a BCA information recorder according to the present invention includes: a recording light output device for outputting a laser beam as BCA recording light towards an inner peripheral side of a prespecified recording layer of an information recording medium that has a plurality of recording layers; an identifying light output device for outputting recording layer identifying light towards the inner peripheral side of the recording layer as well; and a main control unit for controlling output operations and output powers of the recording light output device.

The main control unit employs a structure that includes: a recording layer judging function which analyzes reflected identifying light from the recording layer that is specified in advance to judge whether or not the recording layer associated with the reflected identifying light is a recording layer that has a BCA recording area; and a high-output setting function which, when judged that the recording layer to which the recording identifying light is irradiated is the recording layer that has the BCA recording area, actuates the recording light output device to load prescribed recording information on the BCA recording light and sets the output power of the BCA recording light to a high power for executing BCA recording. The recording layer judging function of the main control unit may be structured to function so as to judge that the recording layer is a recording layer including the BCA recording area, when a geometrical irregularity that is provided in advance to the BCA recording area located on the inner peripheral side of the recording layer is detected by the reflected identifying light.

Therefore, each function of the main control unit effectively works to securely specify the recording layer including the BCA recording area efficiently in a short time. This makes it possible to irradiate the laser beam as the BCA recording light securely to the BCA recording area that is set in advance. The output power of the BCA recording light is increased at the time of BCA recording, so that damaging accidents imposed upon the other layers and the recording area can be effectively avoided in advance. Therefore, it is possible to obtain highly reliable and durable BCA information recorder in this respect.

Furthermore, a BCA information recording method according to the present invention is a method for recording medium information and the like of the information recording medium in a burst cut area recording area that is provided on an inner peripheral side of a specific recording layer by irradiation of a laser beam as BCA recording light. The method includes: a first step (a burst cut area recording area searching step) for irradiating low-power BCA recording light and recording layer identifying light towards the inner peripheral side of the prespecified recording layer of the information recording medium from a beam incident surface of the information recording medium; a second step (a recording layer confirming step) for applying focus servo to the recording layer identifying light; a third step (a judging step) for analyzing reflected light from a geometrical irregularity that is provided in advance to the burst cut area of the recording layer (inner peripheral side of a recording layer) after applying the focus servo to judge whether or not a difference signal thereof has a prescribed amplitude; and a fourth step (a BCA forming step) for increasing an intensity of the BCA recording light and shifting to a BCA forming operation, when judged that the difference signal of the recording layer identifying light is keeping the prescribed amplitude.

The present invention executes detection and checking of the BCA recording layer continuously by the recording layer identifying light and records the BCA recording information by switching the BCA recording light from the low power to the high power and outputting it following the checking of the recording layer. Thus, the medium information and the like regarding the information recording medium can be recorded to the predetermined recording layer securely and promptly, thereby making it possible to obtain an advantage that generation of inferior products can be reduced greatly.

As described above, it is possible with the present invention to securely capture the prespecified recording layer by the recording layer identifying light at the time of recording the BCA in the multilayered optical information recording medium. Thus, such an inconvenience of forming the BCA in an unexpected information recording layer can be prevented securely, which makes it possible to avoid generation of the inferior products. Therefore, it becomes possible to increase the rate of obtaining fine products greatly at the time of manufacturing the optical information recording media that include the multiple recording layers and to greatly shorten the time for identifying the medium in the optical disc device that is operated at the time of reproduction. As a result, it is possible to provide highly reliable and excellent optical information recording medium, BCA information recorder, and BCA information recording method, which have not been obtained conventionally.

BRIEF DESCRIPTION OF THE DRAWINGS

FIG. 5 is a fragmentary sectional view showing an example of a multilayered optical information recording medium of the conventional case;

FIG. 6 shows illustrations for describing a relation between a laser incident surface and a focus error signal of the conventional case, in which FIG. 7 shows illustrations for describing a relation between a laser incident surface and a focus error signal of the conventional case, in which

REFERENCE NUMERALS

Figure 1:
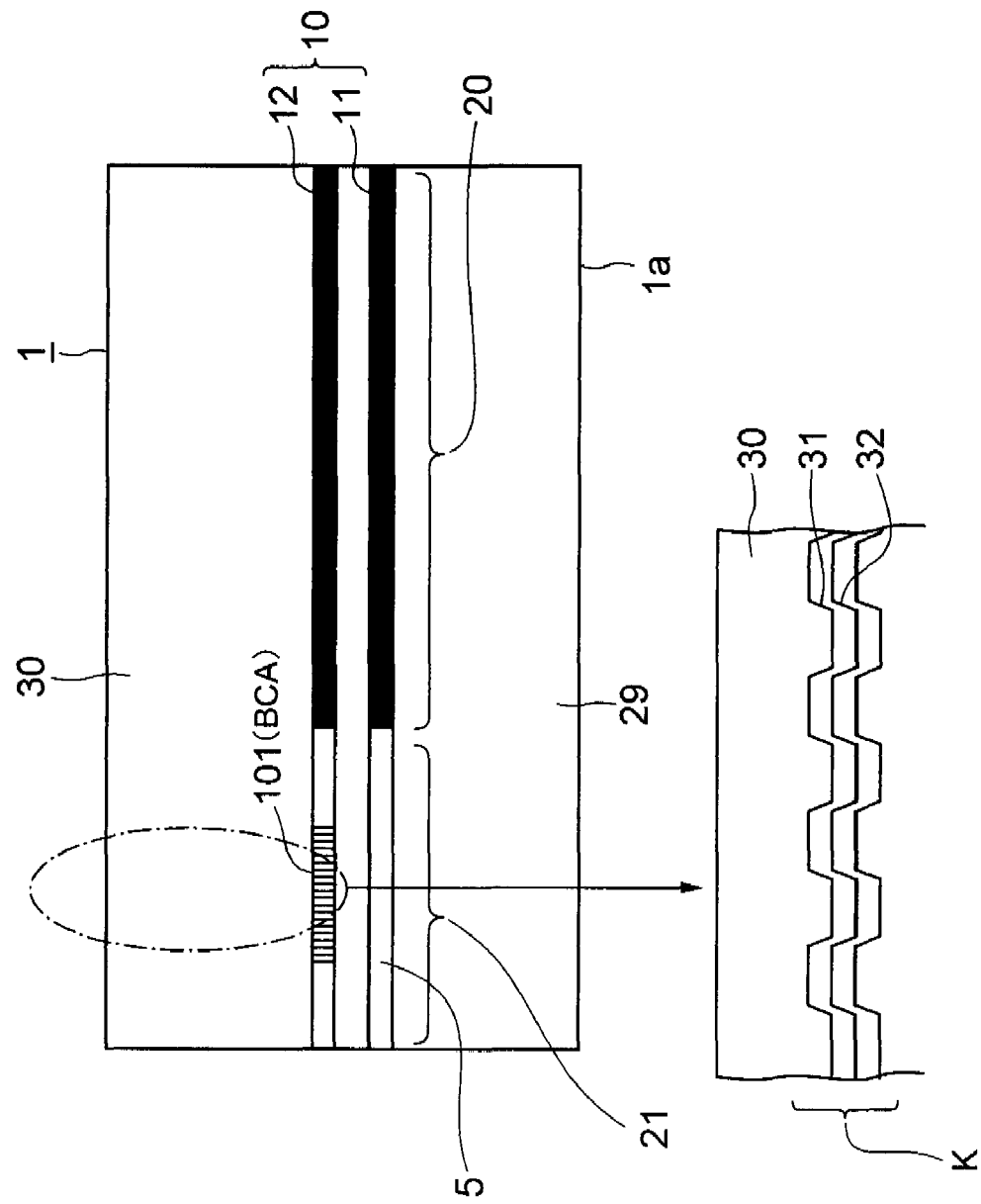
FIG. 1 is a fragmentary sectional view showing an example of a multilayered optical information recording medium according to the present invention.

1 Multilayered optical information recording medium
1a Beam incident surface
5 Mirror area
10 Recording layer
11 0-th information recording layer
12 First information recording layer
20 User recording area
21 BCA area
51 Recording light output device
52 Identifying light output device
55 Main control unit
56 Optical system
57, 58 Photodetector
101 BCA (medium identifying information)
101A Low-reflectance part
K Geometrical irregularity
$P_0$ BCA recording laser light
$P_S$ Recording layer identifying light

BEST MODE FOR CARRYING OUT THE INVENTION

Best modes for carrying out the present invention will be described in detail by referring to the accompanying drawings. The same reference numerals as those of the conventional case are used for the same feature elements.

(Optical Information Recording Medium Including Multi-layered Recording Layer)

Referring to FIG. 1, a multilayered optical information recording medium 1 includes a plurality (two in this exemplary embodiment) of information recording layers 10 that are accessed from a same beam incident surface 1a. Specifically, the multilayered optical information recording medium 1 includes a 0-th information recording layer 11 and a first information recording layer 12 in order from the beam incident surface 1a side. The information recording layer 10 is configured with a multilayered thin film. In a case of a write-once type information recording layer that is capable of writing only once, for example, the information recording layer includes at least a recording film and a reflective film made of an organic dye film or the like. In a case of an information recording layer that is capable of rewriting, the information recording layer includes at least a recording film and a reflective film made of a dielectric film, a phase change film, or the like.

A prescribed user recording area 20 is provided to each of the information recording layers 11 and 12. An area having a prescribed same radius range on the internal circumference of the user recording area 20 of each layer described above (an area in the periphery of a rotation center part of the multilayered optical information recording medium 1) is considered as an area 21 for a burst cut area (BCA). A BCA 101 is provided to the BCA area (set in the vicinity of the innermost peripheral edge) of the first information recording layer 12 out of a plurality of above-described information recording layers 11 and 12. As shown in a fragmentary enlarged view illustrated in the lower part of FIG. 1, a geometrical irregularity K is provided in the BCA forming area as identification information formed with guide grooves, pits, or the like.

The above-mentioned guide grooves may be formed continuously in a spiral form as in the case of the information recording area 20 or may be formed concentrically. Alternatively, the guide grooves may be formed continuously along a whole circumference or may be formed partially. In a case of the pits, it is not essential to form the pits along a whole circumference. Note that the exemplary embodiment will be described hereinafter assuming that the guide grooves or the pits are formed continuously in a spiral form over the entire BCA forming area 21.

Figure 4:
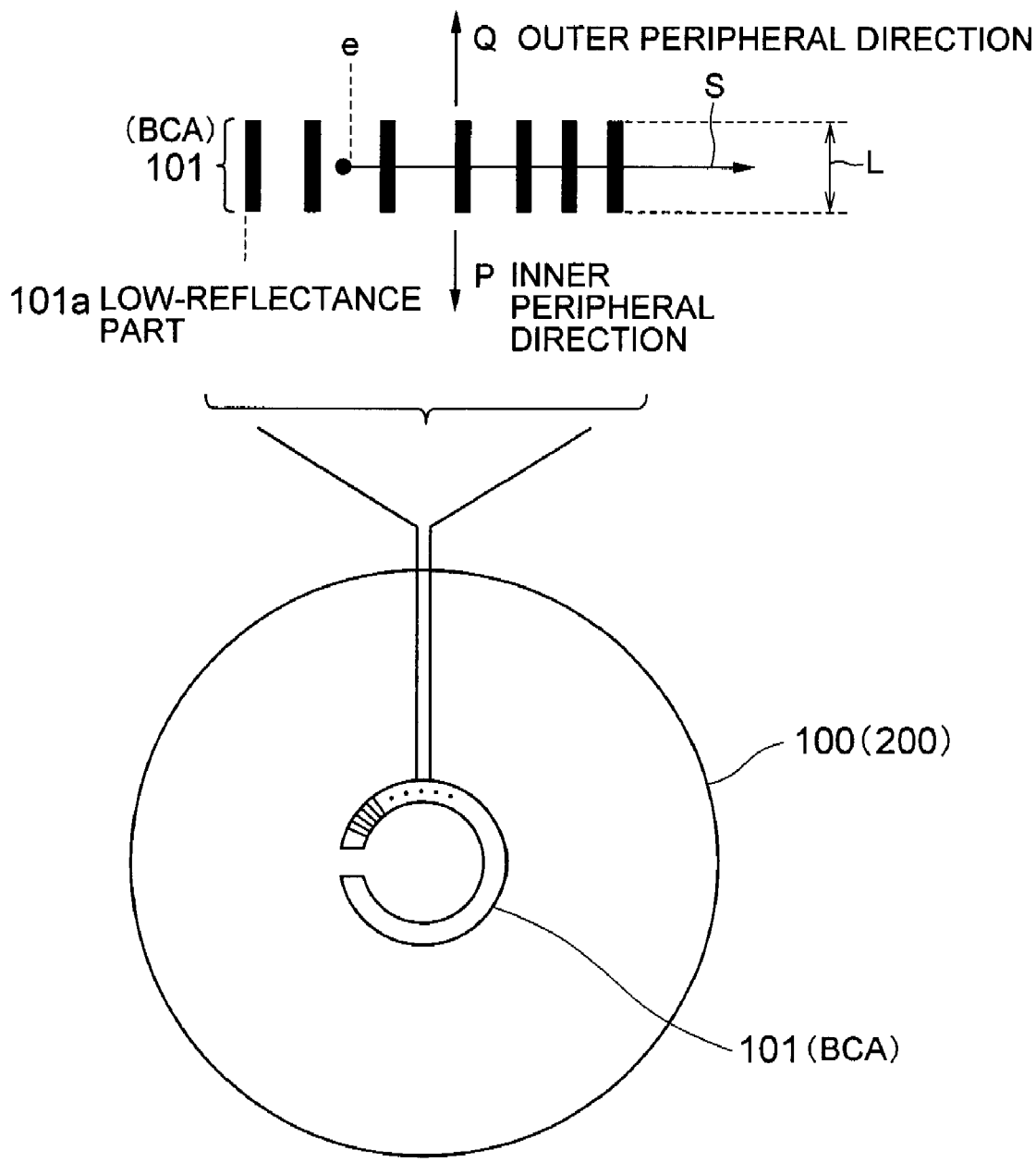
FIG. 4 is an illustration for describing a structural example of a BCA of a conventional case and its forming position.
Figure 6A:
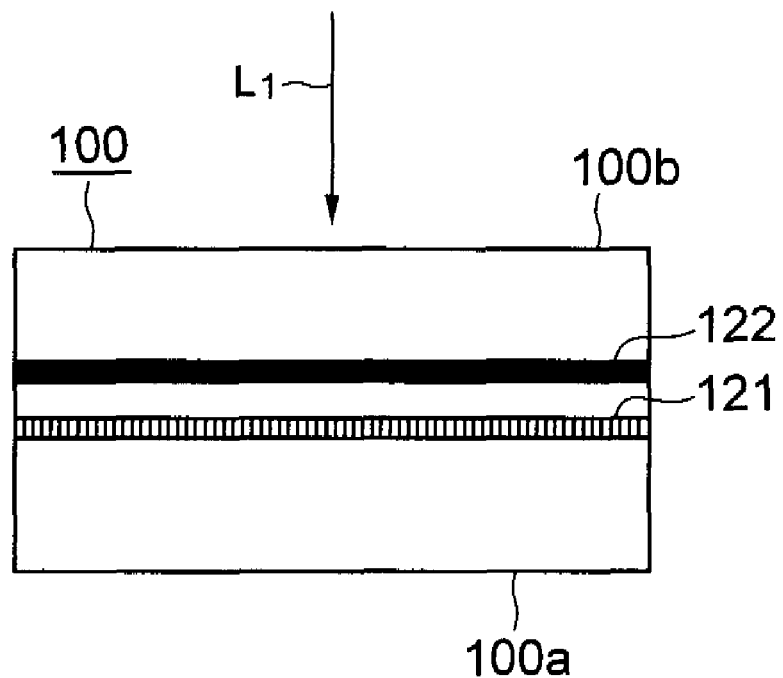
FIG. 6A is an illustration for describing a case where the laser incident surface is set on a first information recording layer (n-th information recording layer) side and FIG. 6B is an illustration for describing the focus error signal that is generated in the case of FIG. 6A.
Figure 6B:
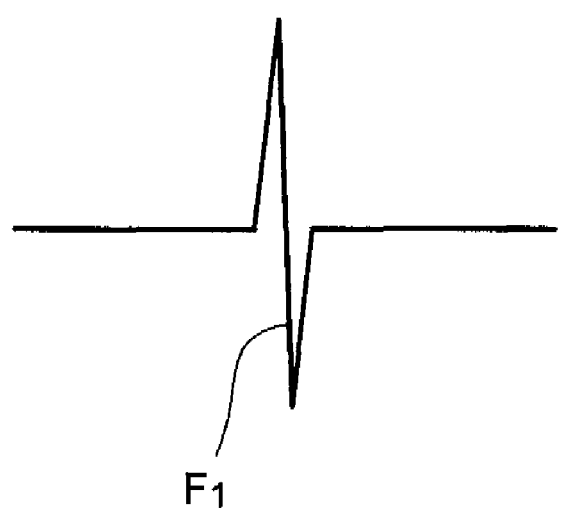
Figure 7A:
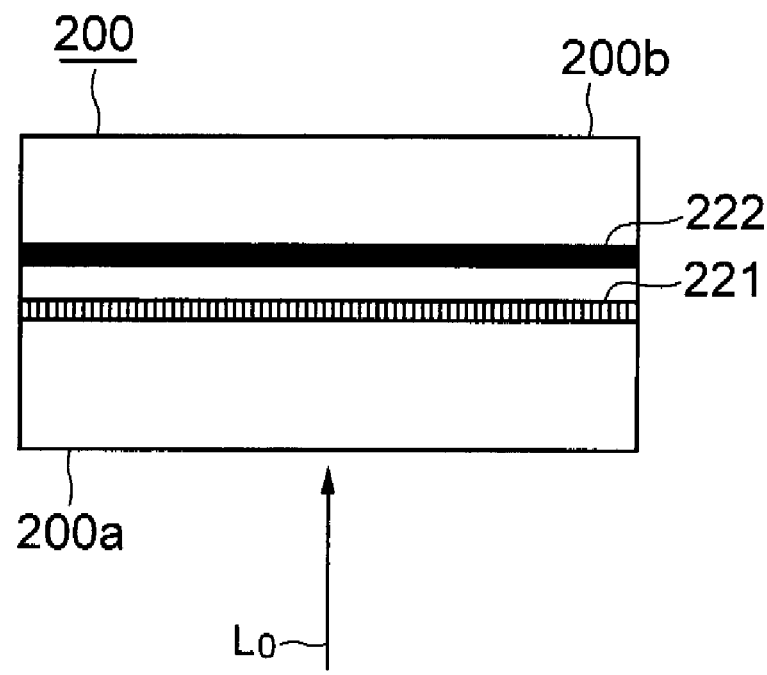
FIG. 7A is an illustration for describing a case where the laser incident surface is set on a 0-th information recording layer side and FIG. 7B is an illustration for describing the focus error signal that is generated in the case of FIG. 7A.
Figure 7B:
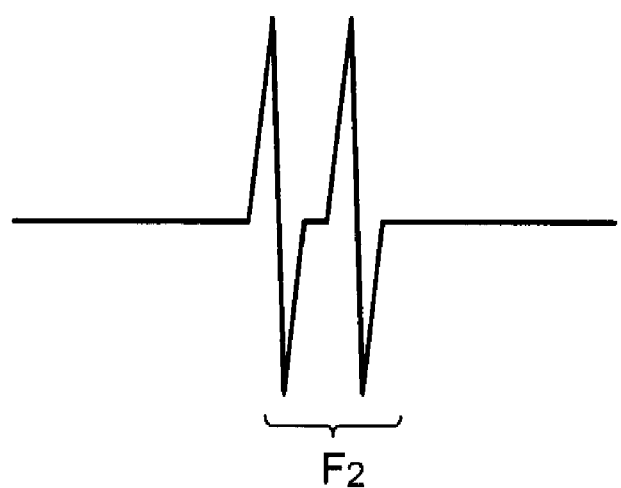

In the meantime, an area corresponding to the BCA in the 0-th information recording layer 11 is formed with a mirror surface 5. The BCA 101 may be formed along the whole same circumference or may be formed on a part of the same circumference. Further, track servo cannot be applied to the radius area where the BCA 101 is provided, so that a width (a length L of each low-reflectance segment 101a that configures the BCA: see FIG. 4) in the radial direction of the BCA 101 is set to have a sufficiently larger width compared to an eccentric amount of a recording track 2, such as a width of about 1 mm. An example of the structure of a BCA pattern formed in this exemplary embodiment is the same as the case of the conventional example shown in FIG. 4. This BCA pattern is formed by a same method as that of the method for forming the BCA pattern of the conventional case described above. With this pattern of the BCA 101, the intervals between the low-reflectance segments 101a having almost a constant width are changed so as to record information signals. With this method, the segments 101a with the same low-reflectance may be formed by simply changing the irradiating positions when forming the low-reflectance segments 101a by laser irradiation. Thus, manufacture thereof becomes easy. In this case, information may be recorded by changing the widths of the low-reflectance part and the high-reflectance part arbitrarily.

FIG. 1 shows a part of a sectional view of the above-described multilayered optical information recording medium 1. As shown in FIG. 1, the optical disc medium 1 is formed by using a transparent member as a material, and two information recording layers (the 0-th information recording layer 11 and the first information recording layer 12) that can be accessed from the beam incident surface 1a are mounted thereto. Each of the information recording layers has the guide grooves formed until the area (the user recording area 20 of FIG. 1) of almost the same inner circumferential radius. The BCA 101 is set in the vicinity of the innermost peripheral edge of the information recording area 20 of the first information recording layer 12. In the meantime, an area at the same radius position corresponding to that in the 0-th information recording layer 11 is the mirror surface 5. Note here that the information recording area 20 indicates a range where the information to be reproduced by the optical disc device exists. Further, reference numerals 29 and 30 indicate the substrate parts made of the transparent member.

The above-described BCA can be formed by using an initializing device of a phase change optical disc such as a DVD-RW, DVD-RAM, or the like. The laser beam irradiated from the initializing device has a converging beam shape of about 50 μm in the disc radius direction and about 1 μm in the disc rotating direction. By irradiating the laser beam while shifting it in the radial direction by about several tens μm, it is possible to form the BCA with a width of about 1 μm in a short time. However, as described above, the BCA is formed in the recordable multilayered optical information recording medium by irradiating the laser beam from the 0-th information recording layer 11 side where a plurality of S-shaped curves are observed. Thus, it can happen that the BCA is formed in a recording layer (the 0-th information recording layer 11 in this exemplary embodiment) that is not the desired recording layer (the first information recording layer 12 in this exemplary embodiment).

As in FIG. 1, the multilayered optical information recording medium 1 according to this exemplary embodiment is illustrated by referring to a case where the geometrical irregularity K with the grooves, the pits, or the like is already being formed in the BCA forming area 21 of the first information recording layer 12. Reference numeral 31 indicates the reflective film, and 32 indicates a recording film of the BCA. The recording film 32 is formed with a dye film, a phase change film, or the like.

With this, it is possible at the time of irradiating the laser beam to judge whether the layer to which the laser beam is being irradiated is the first information recording layer 12 or the 0-th information recording laser 11 based on the presence of the above-described geometrical irregularity K described. Thereby, it becomes possible to capture the first information recording layer 12 securely in both cases where the BCA is formed on the first information recording layer 12 and where it is reproduced.

(Regarding BCA Recording/Reproducing Device)

Figure 2:
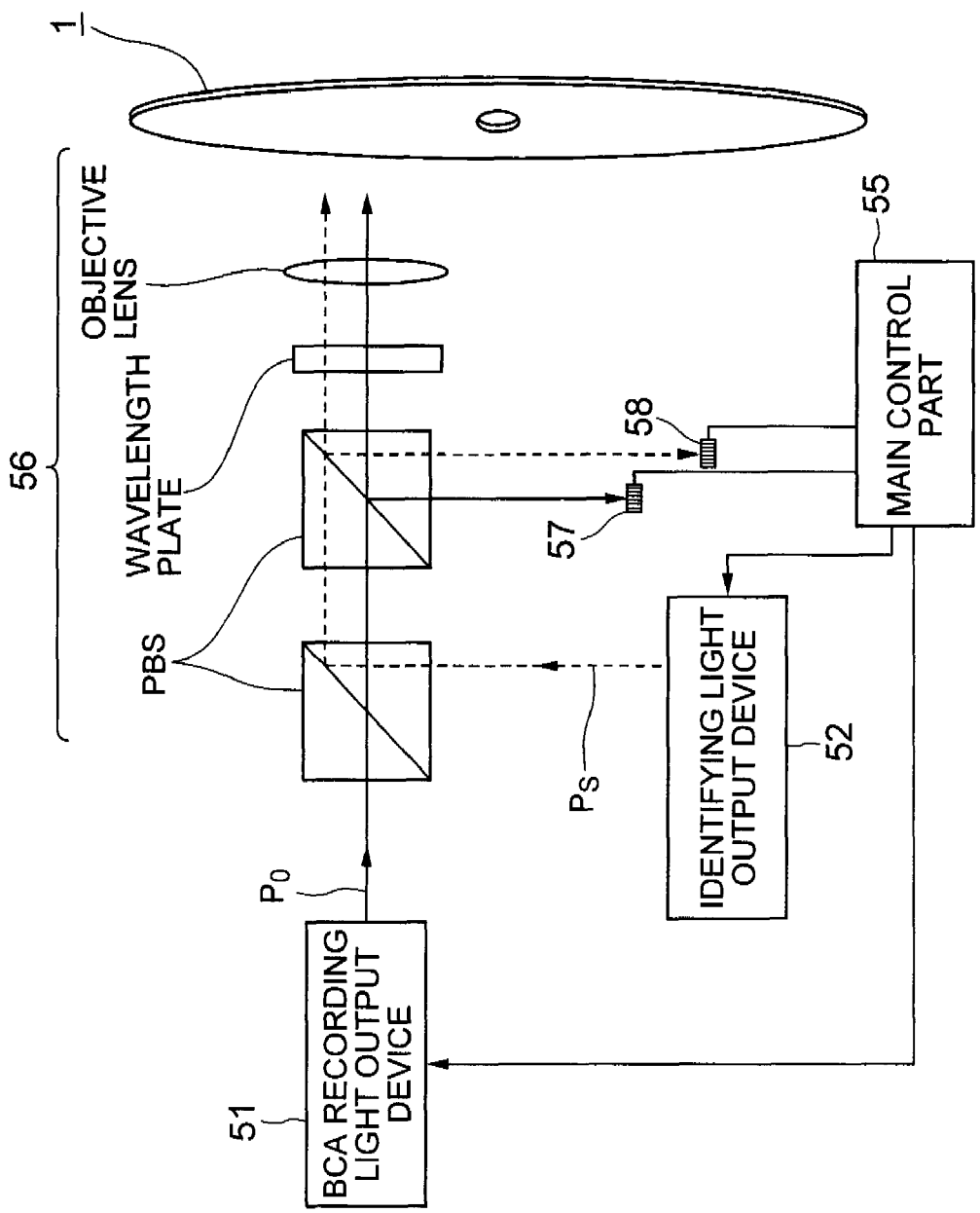
FIG. 2 is a block diagram showing an example of a device for forming a BCA in an inner peripheral area of the multi-layered optical information recording medium shown in FIG. 1.

FIG. 2 shows a basic structure of a BCA information recorder. The BCA information recorder shown in FIG. 2 includes: a recording light output device 51 which outputs a laser beam as a BCA recording light towards the inner peripheral side of a prespecified recording layer (the first information recording layer 12) of the information recording medium 1 which includes a plurality of recording layers (the 0-th information recording layer 11 and the first information recording layer 12 in this exemplary embodiment); an identifying light output device which outputs recording layer identifying light towards the inner peripheral side of that recording layer (the first information recording layer 12) as well; and a main control unit 55 which controls the output actions and the output powers of those recording light output device 51 and the identifying light output device 52.

Further, this BCA information recorder includes: an optical system 56 which guides the recording layer identifying light and the BCA recording light described above towards the inner peripheral area of the information recording medium 1; and photodetectors 57 and 58 which individually detect the reflected light of the recording layer identifying light and the BCA recording light reflected from the prescribed recording layer (the first information recording layer 12).

The above-described main control unit 55 includes: a recording layer judging function which analyzes the reflected identifying light from the prespecified recording layer (the first information recording layer 12) to judge whether or not the recording layer associated with that reflected identifying light is the recording layer that has the BCA recording area; and a high-output setting function which, when judged that the recording layer (the first information recording layer 12) to which the recording identifying light is irradiated is the recording layer that has the BCA recording area, actuates the above-described recording light output device 51 to load prescribed recording information on the above-described BCA recording light and sets the output power of the BCA recording light to a high power for recording BCA. The above-described recording layer judging function operates to judge whether or not the recording layer is the one that has the BCA recording area, when the geometrical irregularity K provided in advance in the BCA recording area located on the inner peripheral side of the recording layer is detected by the reflected identifying light described above.

This will be described in more details.

As described above, the geometrical irregularity K provided in the BCA forming area 21 of the first information recording layer 12 is judged by irradiating a laser beam (recording layer identifying light $P_S$), which is different from a laser beam for forming the BCA (BCA recording light $P_0$), to the information recording layer 10.

The laser beam of the BCA recording light $P_0$ has an extremely large diameter in the radial direction, so that it is not possible to detect the geometrical irregularity K formed with guide grooves, pits, or the like. In the meantime, it is possible to recognize the presence of the geometrical irregularity K formed with guide grooves, pits, or the like with the laser beam in about the size that is used for recording or reproduction, by a sum signal or a difference signal.

The recording layer identifying light $P_S$ may be generated by a diffraction grating from the BCA-forming laser beam (the BCA recording light $P_0$) or a laser beam different from the BCA recording light $P_0$ may be used as well. It is possible to judge the geometrical irregularity K when the converging beam diameter of the recording layer identifying light $P_S$ is almost about the same as the cycle in the radial direction of the guide grooves or the pits formed in the BCA recording area 21. In this case, judgment of the geometrical irregularity K is executed by the main control unit 55 described above.

The geometrical irregularity K formed on the BCA recording area 21 is provided simply for identifying the information recording layer 10. However, it is necessary to mind not to have a noise caused due to the geometrical irregularity K mixed into a BCA reproducing signal by the laser beam at the time of recording or reproduction. The BCA is reproduced by a sum signal, so that the guide grooves or the pits may be formed with which the signal amplitude in reproduction with the sum signal becomes small and the signal amplitude in reproduction with a difference signal becomes large. For example, the pitch of the guide grooves may be set as about the same as the beam diameter of the recording layer identifying light $P_S$. If not, when the pitch of the guide grooves is wider than the beam diameter of the recording layer identifying light $P_S$, the groove width may be set as almost half the groove pitch.

Under such conditions, the amplitude of the reproduction sum signal (called a groove crossing signal) caused due to the geometrical irregularity K when only focus servo is applied is extremely small, so that mixture of a noise to the BCA reproducing signal can be suppressed. Meanwhile, the amplitude of the difference signal (corresponds to a track error signal) of the recording layer identifying light $P_S$ is sufficiently large, so that judgment of the information recording layer can be executed securely. The control operation of the focus servo is executed by a device of a known technique that is not shown.

It is simple and preferable to use a same exposure light source for forming the grooves in the BCA area 21 and for forming the guide grooves in the user recording area 20. However, in that case, it is difficult to form grooves with an extremely wider width than that of the guide grooves of the user information recording area 20. Since the groove width in the user information recording area 20 of the optical information recording medium 1 that uses a semiconductor laser with a wavelength of approximately 400 nm is about 0.2-0.4 μm, it is desirable to set the groove width in the BCA area 21 to be 0.5 μm or less and the pitch to be 1 μm or less.

(Forming Action of BCA)

Figure 3:
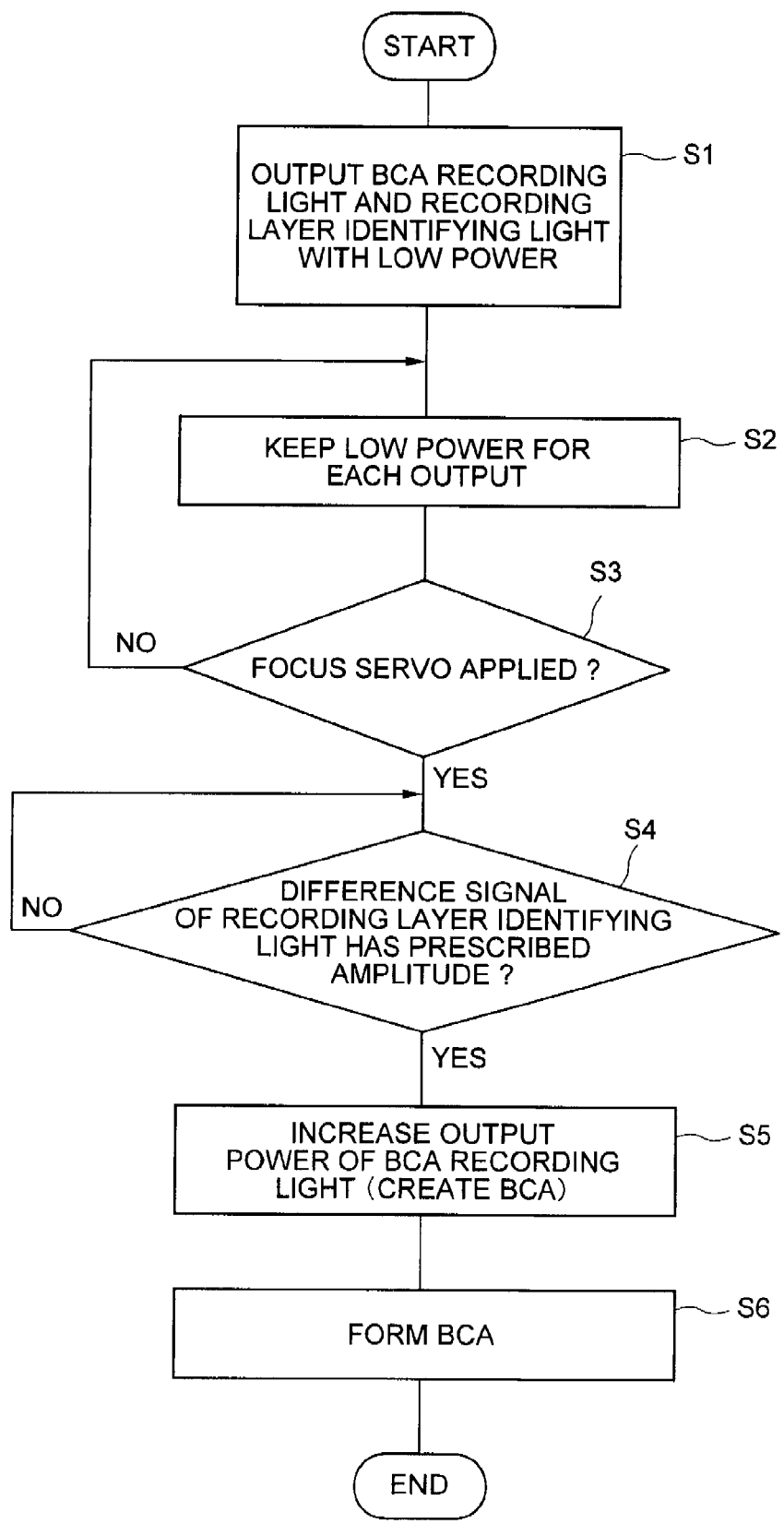
FIG. 3 is a flowchart showing an operation of a main control unit disclosed in FIG. 2.

Next, by referring to FIG. 2-FIG. 3, there will be described an operation example of a case where a BCA is formed by irradiating the BCA recording light $P_O$, to a burst cut area recording area that is provided on the inner peripheral side of a specific recording layer (a BCA information recording method).

First, the entire device shown in FIG. 2 is actuated to irradiate the low-power BCA recording light $P_O$ and recording layer identifying light $P_S$ towards the inner peripheral side of the prespecified recording layer (the first information recording layer 12) of the information recording medium 1 from the beam incident surface 1a of the information recording medium 1 to search for the burst cut area (BCA) recording layer (steps S1, S2: the first step). Then, after confirming a capture of the recording layer by obtaining the reflected light from the recording layer (the first information recording layer 12), focus servo is applied to the recording layer identifying light $P_S$ (step S3: the second step). After applying the focus servo, the reflected light from the geometrical irregularity provided in advance to the bust cut area of the recording layer is analyzed to judge whether or not the difference signal has a prescribed amplitude (step S4: the third step). When judged that the difference signal of the reflected recording layer identifying light $P_S$ has the prescribed amplitude, the intensity of the above-described BCA recording light $P_O$ is increased and the operation is shifted to form the BCA (steps S4, S5: the fourth step).

This will be described in more details hereinafter.

In FIG. 2, the laser beam for forming the BCA is expressed as the BCA recording light. The focus error signal may be generated from any of the BCA recording light $P_O$ or the recording layer identifying light $P_S$. In the case of FIG. 2, it is generated from the BCA recording light $P_O$. The power of the recording layer identifying light $P_S$ is maintained to a low power by the above-described main control unit 55 so that there is no change generated in the recording layer 10. In the meantime, the power of the BCA recording light $P_O$ is increased to shift to the operation for forming the BCA upon confirming that the difference signal of the recording layer identifying light $P_S$ has the prescribed amplitude after applying the focus servo, while it is maintained to a low power in the beginning. Controls of the operation thereof are executed by the main control unit 55 shown in FIG. 2.

After applying the focus servo, if the amplitude of the difference signal of the recording layer identifying light $P_S$ is a prescribed level or lower, the focus servo is continuously applied repeatedly (until it is confirmed that the amplitude of the difference signal of the recording layer identifying light $P_S$ comes to have the prescribed level or lower) while maintaining the low power of the BCA recording light $P_O$. Thereafter, the power of the BCA recording light $P_O$ is increased to shift to the operation for forming the BCA.

With this, the high-power BCA recording light $P_O$ can be irradiated only when the focus servo is applied to a prescribed information recording layer 10 (the first information recording layer 12 herein). Thus, it is possible to prevent the BCA from being formed in an unexpected information recording layer (the 0-th information recording layer 11 herein). Further, this exemplary embodiment is structured to output the low-level BCA recording light $P_O$ simultaneously with the output of the recording layer identifying light $P_S$. Thus, the BCA recording light $P_O$ can be switched to a high output immediately upon confirming that the layer is the BCA recording layer. As a result, the recording operation of the BCA can be executed promptly with high precision, and recording of the BCA to a wrong recording layer can be avoided securely. Therefore, it is advantageous that the reliability of the entire device can be improved dramatically.

Further, regarding the following respects, it is convenient to have the area opposing to the BCA area 21 as the mirror surface 5 in the above-described 0-th information recording layer 11 also when reproducing the burst cut information after forming the BCA.

Even when it is intended to apply focus to the first information recording layer 12 for reproducing the burst cut information but the focus servo is mistakenly applied to the 0-th information recording layer 11, there is no significant signal detected in the reproduction sum signals. Thus, it is possible to immediately detect that the focus servo is applied to the 0-th information recording layer 11. As a result, the mistakenly applied focus servo can be recognized immediately, and reproduction of the burst cut information can be executed promptly by reapplying the focus to the first information recording layer 12.

Assuming that the grooves are also formed in the area of the 0-th information recording layer 11, which opposes to the BCA area 21, a groove crossing signal is mixed into the reproduction sum signals. Thus, it is necessary to decode the sum signals in order to judge whether the recording layer to which focus servo is applied is the information recording layer 11 or the information recording layer 12, which takes time. In order to avoid this, this exemplary embodiment is structured to have no geometrical irregularity K formed in the area (mirror area 5) of the 0-th information recording layer 11 opposing to the BCA area 21.

Example 1

It was tried to form a BCA on the first information recording layer 12 by using a write-once type double-layered optical information recording medium as the multilayered optical information recording medium. The 0-th information recording layer 11 was set to have guide grooves with a pitch of 0.4 μm in the user recording area 20, and the area corresponding to the BCA is formed as the mirror surface 5.

In the meantime, the first information recording layer 12 was structured to have guide grooves with a pitch of 0.4 μm formed in both the user recording area 20 and the BCA forming area 21. By forming the guide grooves of the user recording area 20 and the BCA forming area 21 to have the same pitch, it becomes unnecessary to use an additional laser beam at the time of mastering and it simply needs to expand the exposure area, which is simple and easy. The BCA forming area 21 was within a range of a radius of 22.3-23.2 mm, and the guide grooves were formed continuously in a spiral form in that range of the first information recording layer 12.

A semiconductor laser with a wavelength of 780 nm was used as the BCA recording laser light $P_O$. The aperture of a converging objective lens of the BCA recording laser light $P_O$ was 0.55, the converging beam diameter was 1 µm (rotating direction)×50 µm (radial direction), and the maximum output was 1.5 W. A semiconductor laser with a wavelength of 405 nm was used as the recording layer identifying light $P_S$. The converging beam of the recording layer identifying light $P_S$ was 0.6 µm (both in the rotating direction and in the radial direction). The rotating linear velocity of the disc at the time of BCA recording was set as 5 m/s.

When irradiating the BCA recording laser light $P_O$ and the recording layer identifying light $P_S$ from the 0-th information recording layer 11 side, the focus error signal was generated from the BCA recording laser light $P_O$. The power at the time of applying the focus servo was set as 400 mW for the recording laser light and set as 0.5 mW for the recording layer identifying light $P_S$. The focus servo was applied to the first information recording layer 12 as a target layer for inserting the focus. Then, after confirming that the difference signal amplitude of the recording layer identifying light $P_S$ was in a prescribed level or more, the power of the BCA recording laser light $P_O$ was modulated in two levels of 1 W and 400 mW, and the laser beam was irradiated while being shifted by 25 µm per rotation of the disc in the radial direction to form a BCA.

It was tried to form the BCA on one-hundred pieces of multilayered optical information recording media 1 by the above-described method. The success probability thereof was 100%. In the meantime, the success probability was about 60% when the BCA was formed by simply irradiating the BCA recording laser beam by using the multilayered optical information recording media 1 where the BCA forming area of the first information recording layer 12 was formed as the mirror surface.

Example 2

It was tried to form a BCA on the first information recording layer 12 by using, as the multilayered optical information recording medium 1, a rewritable-type double-layered optical information recording medium having a phase change film. The 0-th information recording layer 11 was set to have guide grooves with a pitch of 0.74 µm in the information recording area 20 and the area corresponding to the BCA was formed as the mirror surface 5.

In the meantime, the first information recording layer 12 was structured to have guide grooves with a pitch of 0.74 µm formed in both the information recording area 20 and the BCA forming area 21. The BCA forming area 21 was within a range of a radius of 22.3-23.2 mm, and the guide grooves were formed continuously in a spiral form in that range of the first information recording layer 12.

A semiconductor laser with a wavelength of 780 nm was used as the BCA recording laser light $P_O$. The aperture of the converging objective lens of the BCA recording laser light $P_O$ was 0.55, the converging beam diameter was 1 µm (rotating direction)×50 µm (radial direction), and the maximum output was 1.5 W.

A semiconductor laser with a wavelength of 405 nm was used as the recording layer identifying light $P_S$. The converging beam of the recording layer identifying light $P_S$ was 0.6 µm (both in the rotating direction and in the radial direction). The rotating linear velocity at the time of BCA recording was set as 5 m/s.

When irradiating the recording laser light and the recording layer identifying light from the 0-th information recording layer 11 side, the focus error signal was generated from the BCA recording laser light $P_O$. The power at the time of applying the focus servo was set as 400 mW for the recording laser light $P_O$ and set as 0.5 mW for the recording layer identifying light $P_S$. The focus servo was applied to the first information recording layer 12 as a target layer for inserting the focus. Then, after confirming that the difference signal amplitude of the recording layer identifying light $P_S$ was in a prescribed level or more, the power of the BCA recording laser light $P_O$ was modulated in two levels of 800 mW and 400 mW, and the laser beam was irradiated by while being shifted by 25 µm per rotation of the disc in the radial direction to form a BCA.

It was tried to form the BCA on one-hundred pieces of multilayered optical information recording media 1 by the above-described method. The success probability thereof was 100%. In the meantime, the success probability was about 65% when the BCA was formed by simply irradiating the BCA recording laser light by using the multilayered optical information recording media where the BCA forming area of the first information recording layer 12 was formed as the mirror surface.

By applying the above-described exemplary embodiment in this manner, it is possible to form the BCA securely on a prescribed information recording layer both for the multi-access-type and rewritable-type multilayered optical information recording media.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. An optical information recording medium comprising:
   at least two recording layers for recording or reproducing information by irradiation of a laser beam,
   wherein a burst cut area recording area as an area for recording at least medium identifying information is provided on an inner peripheral side of one recording layer among the at least two recording layers, and a mirror surface is provided at a burst cut area recording area of another recording layer among the at least two recording layers and
   a pre-groove or pre-pit, opposing to the mirror surface, is provided in the burst cut area recording area of the one recording layer.

2. The optical information recording medium as claimed in claim 1, wherein the pre-groove or pre-pit is a successively formed pre-groove or pre-pit in a concentric form or spiral form, the successively formed pre-groove or pre-pit surrounding a rotation center of the optical information recording medium.

3. The optical information recording medium as claimed in claim 1, wherein the pre-groove or pre-pit is a successively formed pre-groove or pre-pit in a concentric form or spiral form at a pitch of 1 µm or less in a radial direction of the optical information recording medium.

4. The optical information recording medium as claimed in claim 1, wherein the pre-groove or pre-pit is a pre-pit formed with pit strings.

5. The optical information recording medium as claimed in claim 1, wherein the pre-groove or pre-pit is a pre-groove configured with grooves in a concentric form or spiral form.

6. The optical information recording medium as claimed in claim 1, wherein the one recording layer comprises a laminated phase change recording film.

7. The optical information recording medium as claimed in claim 1, wherein the one recording layer comprises a laminated recording film, the laminated recording film exhibiting an irreversible optical characteristic change in response to irradiation of the laser beam.

8. A burst cut area (BCA) information recorder, comprising:
 a recording light output device for outputting a laser beam as BCA recording light towards an inner peripheral side of a prespecified recording layer of an information recording medium that has a plurality of recording layers;
 an identifying light output device for outputting recording layer identifying light towards the inner peripheral side of the recording layer as well; and
 a main control unit for controlling output operations and output powers of the recording light output device,
 wherein the main control unit comprises:
  a recording layer judging function which analyzes reflected identifying light from the prespecified recording layer to judge whether or not the prespecified recording layer associated with the reflected identifying light is a recording layer that has a BCA recording area; and
  a high-output setting function which, when judged that the prespecified recording layer is the recording layer that has the BCA recording area, actuates the recording light output device to load prescribed recording information on the BCA recording light, and sets the output power of the BCA recording light to a high power for executing BCA recording.

9. A BCA information recorder as claimed in claim 8, wherein the recording layer judging function judges that the recording layer is the recording layer including the BCA recording area when a pre-groove or pre-pit is detected by the reflected identifying light in the BCA recording area located on the inner peripheral side of the recording layer.

10. A burst cut area (BCA) information recorder, comprising:
 a recording light output means for outputting a laser beam as BCA recording light towards an inner peripheral side of a prespecified recording layer of an information recording medium that has a plurality of recording layers;
 an identifying light output means for outputting recording layer identifying light towards the inner peripheral side of the recording layer as well; and
 a main control means for controlling output operations and output powers of the recording light output means,
 wherein the main control means comprises:
  a recording layer judging function which analyzes reflected identifying light from the prespecified recording layer to judge whether or not the prespecified recording layer associated with the reflected identifying light is a recording layer that has a BCA recording area; and
  a high-output setting function which, when judged that the prespecified recording layer is the recording layer that has the BCA recording area, actuates the recording light output means to load prescribed recording information on the BCA recording light and sets the output power of the BCA recording light to a high power for executing BCA recording.

11. A burst cut area (BCA) information recording method for recording medium information of an information recording medium in a BCA recording area that is provided on an inner peripheral side of a specific recording layer by irradiation of a laser beam as BCA recording light, the method comprising:
 irradiating low-power BCA recording light and recording layer identifying light towards the inner peripheral side of the specific recording layer of the information recording medium from a beam incident surface of the information recording medium;
 applying focus servo to the recording layer identifying light;
 analyzing reflected light from a pre-groove or a pre-pit that is provided in advance to the BCA recording area of the specific recording layer after applying the focus servo to judge whether or not a difference signal thereof has a prescribed amplitude; and
 shifting to a BCA forming operation by increasing an intensity of the BCA recording light in a case of being judged that the difference signal of the recording layer identifying light has the prescribed amplitude.

12. A burst cut area (BCA) information recorder, comprising:
 a recording light output device for outputting a laser beam as BCA recording light towards an inner peripheral side of a prespecified recording layer of an information recording medium that has a plurality of recording layers;
 an identifying light output device for outputting recording layer identifying light towards the inner peripheral side of the recording layer as well; and
 a main control unit for controlling output operations and output powers of the recording light output device,
 wherein the information recording medium includes:
  burst cut areas on each inner peripheral side of at least two recording layers;
  a mirror surface at one burst cut area of one recording layer; and
  a pre-groove or pre-pit, opposing to the mirror surface, in another burst cut area of another recording layer, and
 wherein the main control unit comprises:
  a recording layer judging function which analyzes reflected identifying light from each burst cut area to judge on which burst cut area of the at least two recording layers the reflected identifying light has been reflected; and
  a high-output setting function which: actuates the recording light output device to set, based on a result of the judging, the output power to a level suitable for recording to the burst cut area; when judged that the prespecified recording layer is the recording layer that has the BCA recording area, actuates the recording light output device to load prescribed recording information on the BCA recording light; and sets the output power of the BCA recording light to a high power for executing BCA recording.

13. A burst cut area (BCA) information recorder, comprising:
 a recording light output means for outputting a laser beam as BCA recording light towards an inner peripheral side of a prespecified recording layer of an information recording medium that has a plurality of recording layers;

an identifying light output means for outputting recording layer identifying light towards the inner peripheral side of the recording layer as well; and a main control means for controlling output operations and output powers of the recording light output means, wherein the information recording medium includes:
  burst cut areas on each inner peripheral side of at least two recordings layers;
  a mirror surface at one burst cut area of one recording layer; and
  a pre-groove or pre-pit, opposing to the mirror surface, in another burst cut area of another recording layer, and wherein the main control means comprises:
  a recording layer judging function which analyzes reflected identifying light from each burst cut area to judge on which burst cut area of the at least two recordings layers the reflected identifying light has been reflected; and
  a high-output setting function which: actuates the recordings light output means to set, based on a result of the judging, the output power to a level suitable for recording to the burst cut area; when judged that the prespecified recording layer is the recording layer that has the BCA recording area, actuates the recording light output means to load prescribed recording information on the BCA recording light; and sets the output power of the BCA recording light to a high power for executing BCA recording.

14. A burst cut area (BCA) information recording method for recording medium information of an information recording medium in a BCA recording area that is provided on an inner peripheral side of a specific recording layer by irradiation of a laser beam as BCA recording light, the information recording medium includes: burst cut areas on the inner peripheral side of at least two recording layers; a mirror surface at one burst cut area of one recording layer; and a pre-groove or pre-pit, opposing to the mirror surface, in another burst cut area of another recording layer, the method comprising:
  analyzing reflected identifying light from each burst cut area to judge on which burst cut area of the least two recording layers the reflected identifying light has been reflected; and
  setting, based on a result of the judging, the output power to a level suitable for recording to the burst cut area.

* * * * *